(12) United States Patent
Torigoshi et al.

(10) Patent No.: US 10,776,058 B2
(45) Date of Patent: Sep. 15, 2020

(54) PROCESSOR THAT PERMITS OR RESTRICTS ACCESS TO DATA STORED IN A FIRST AREA OF A MEMORY

(71) Applicant: Konica Minolta, Inc., Chiyoda-ku, Tokyo (JP)

(72) Inventors: Akihiro Torigoshi, Itami (JP); Kaitaku Ozawa, Nishinomiya (JP); Kenichi Takahashi, Osaka (JP); Masaya Hashimoto, Itami (JP); Tomonari Yoshimura, Kyoto (JP); Keisuke Sato, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/288,408

(22) Filed: Feb. 28, 2019

(65) Prior Publication Data

US 2019/0272130 A1    Sep. 5, 2019

(30) Foreign Application Priority Data

Mar. 1, 2018    (JP) .................................. 2018-036512

(51) Int. Cl.
*G06F 3/12*       (2006.01)
*G06F 21/60*      (2013.01)
(Continued)

(52) U.S. Cl.
CPC .......... *G06F 3/1238* (2013.01); *G06F 3/1222* (2013.01); *G06F 3/1287* (2013.01); *G06F 12/1408* (2013.01); *G06F 12/1458* (2013.01); *G06F 21/602* (2013.01); *G06F 21/604* (2013.01); *G06F 21/608* (2013.01); *G06F 21/629* (2013.01); *H04L 63/10* (2013.01);
(Continued)

(58) Field of Classification Search
None
See application file for complete search history.

(56) References Cited

U.S. PATENT DOCUMENTS

| 6,351,817 B1* | 2/2002 | Flyntz | G06F 21/32 380/202 |
| 2010/0027553 A1* | 2/2010 | Hardisty | H04L 12/462 370/401 |

(Continued)

FOREIGN PATENT DOCUMENTS

| JP | 2009253389 A | 10/2009 |
| JP | 2014049132 A | 3/2014 |

*Primary Examiner* — Dov Popovici
(74) *Attorney, Agent, or Firm* — Buchanan Ingersoll & Rooney PC

(57) ABSTRACT

An information processing apparatus includes a first network interface configured to accept access from a terminal on a first network, a second network interface configured to accept access from a terminal on a second network, a hardware processor configured to process access from a terminal on the first network and a terminal on the second network, and a memory. The memory includes a first area configured to store data received from the terminal on the second network. The second network is higher in security level than the first network. Access to data stored in the first area from the terminal on the second network is permitted and access to data stored in the first area from the terminal on the first network is restricted.

17 Claims, 22 Drawing Sheets

(51) Int. Cl.
*H04L 29/06* (2006.01)
*G06F 12/14* (2006.01)
*G06F 21/62* (2013.01)

(52) U.S. Cl.
CPC ...... *H04L 63/20* (2013.01); *G06F 2221/2141* (2013.01); *G06F 2221/2149* (2013.01)

(56) References Cited

U.S. PATENT DOCUMENTS

| | | | | |
|---|---|---|---|---|
| 2012/0166746 A1* | 6/2012 | Amar | ...................... | G06F 21/74 |
| | | | | 711/163 |
| 2016/0379003 A1* | 12/2016 | Kapoor | .................. | G06Q 20/20 |
| | | | | 726/27 |
| 2017/0078269 A1* | 3/2017 | Han | ...................... | H04L 9/3234 |

* cited by examiner

PROCESSOR THAT PERMITS OR RESTRICTS ACCESS TO DATA STORED IN A FIRST AREA OF A MEMORY

The entire disclosure of Japanese Patent Application No. 2018-036512 filed on Mar. 1, 2018 is incorporated herein by reference in its entirety.

BACKGROUND

Technological Field

The present disclosure relates to an information processing apparatus which processes access from terminals constituting a plurality of networks.

Description of the Related Art

An information processing apparatus which processes access from terminals constituting a plurality of networks has conventionally been proposed. For example, Japanese Laid-Open Patent Publication No. 2014-049132 discloses "a network switching terminal comprising a switching processing unit including a first operation system assigned to a first LAN card, a second operation system assigned to a second LAN card, an I/O device coupling unit coupled to a monitor, a keyboard, and a mouse, a switching unit including a first data reception unit which transmits and receives first input/output data between the first operation system and the I/O device coupling unit and a second data reception unit which transmits and receives second input/output data between the second operation system and the I/O device coupling unit, and a control unit which, when a first button operates, inactivates the data reception unit currently being activated, and activates the other data reception unit currently being inactivated" (Abstract of Japanese Laid-Open Patent Publication No. 2014-049132).

Japanese Laid-Open Patent Publication No. 2009-253389 discloses "a method for authentication of an access point for use which allows access only to a designated work point in a company." According to the method, a person responsible for a system of a company which uses an application service provider (ASP) service appoints a reliable employee as a person in charge of system key unlocking. As the person in charge of system key unlocking unlocks the system key only during his/her working hours on his/her workdays with a predetermined system key unlocking terminal, a user client terminal connected to a network to which the system key unlocking terminal belongs can access an ASP service system.

SUMMARY

In recent years, an information processing apparatus as above may store therein data received via a plurality of networks. The plurality of networks may be different from one another in security level. Therefore, in some cases, the information processing apparatus should not provide data stored therein in a similar manner to all terminals on the plurality of networks.

Therefore, a technique for providing a terminal with data stored in an information processing apparatus in a manner in accordance with a security level of a path through which the data was obtained has been demanded.

To achieve at least one of the abovementioned objects, according to an aspect of the present disclosure, an information processing apparatus reflecting one aspect of the present disclosure comprises a first network interface configured to accept access from a terminal on a first network, a second network interface configured to accept access from a terminal on a second network, a hardware processor configured to process access from a terminal on the first network and a terminal on the second network, and a memory. The memory includes a first area configured to store data received from the terminal on the second network. The second network is higher in security level than the first network. The hardware processor is configured to permit access to data stored in the first area from the terminal on the second network and restrict access to data stored in the first area from the terminal on the first network.

To achieve at least one of the abovementioned objects, according to another aspect of the present disclosure, an information processing apparatus reflecting another aspect of the present disclosure comprises a first network interface configured to accept access from a terminal on a first network, a second network interface configured to accept access from a terminal on a second network, a hardware processor configured to process access from a terminal on the first network and a terminal on the second network, and a memory. The memory includes a first area configured to store data received from the terminal on the second network. The second network is higher in security level than the first network. The hardware processor is configured to transmit data stored in the first area to the terminal on the first network as being encrypted and transmit data stored in the first area to the terminal on the second network as being decrypted.

To achieve at least one of the abovementioned objects, according to yet another aspect of the present disclosure, a computer readable recording medium having a program stored thereon in a non-transitory manner reflecting yet another aspect of the present disclosure is provided, the program being executed by a computer of an information processing apparatus including a first network interface configured to accept access from a terminal on a first network, a second network interface configured to accept access from a terminal on a second network, and a memory. The memory includes a first area in which data received from the terminal on the second network is stored together with information representing reception of the data from the terminal on the second network. The second network is higher in security level than the first network. The program, by being executed, causes the computer to perform accepting an access; determining whether the accepted access is from the terminal on the first network; and restricting access to data stored in the first area if the accepted access is from the terminal on the first network.

To achieve at least one of the abovementioned objects, according to yet another aspect of the present disclosure, a computer readable recording medium having a program stored thereon in a non-transitory manner reflecting yet another aspect of the present disclosure is provided, the program being executed by a computer of an information processing apparatus including a first network interface configured to accept access from a terminal on a first network, a second network interface configured to accept access from a terminal on a second network, and a memory. The memory includes a first area configured to store data received from the terminal on the second network. The second network is higher in security level than the first network. The program, by being executed, causes the computer to perform transmitting data stored in the first area to the terminal on the first network as being encrypted and transmitting data stored in the first area to the terminal on the second network as being decrypted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
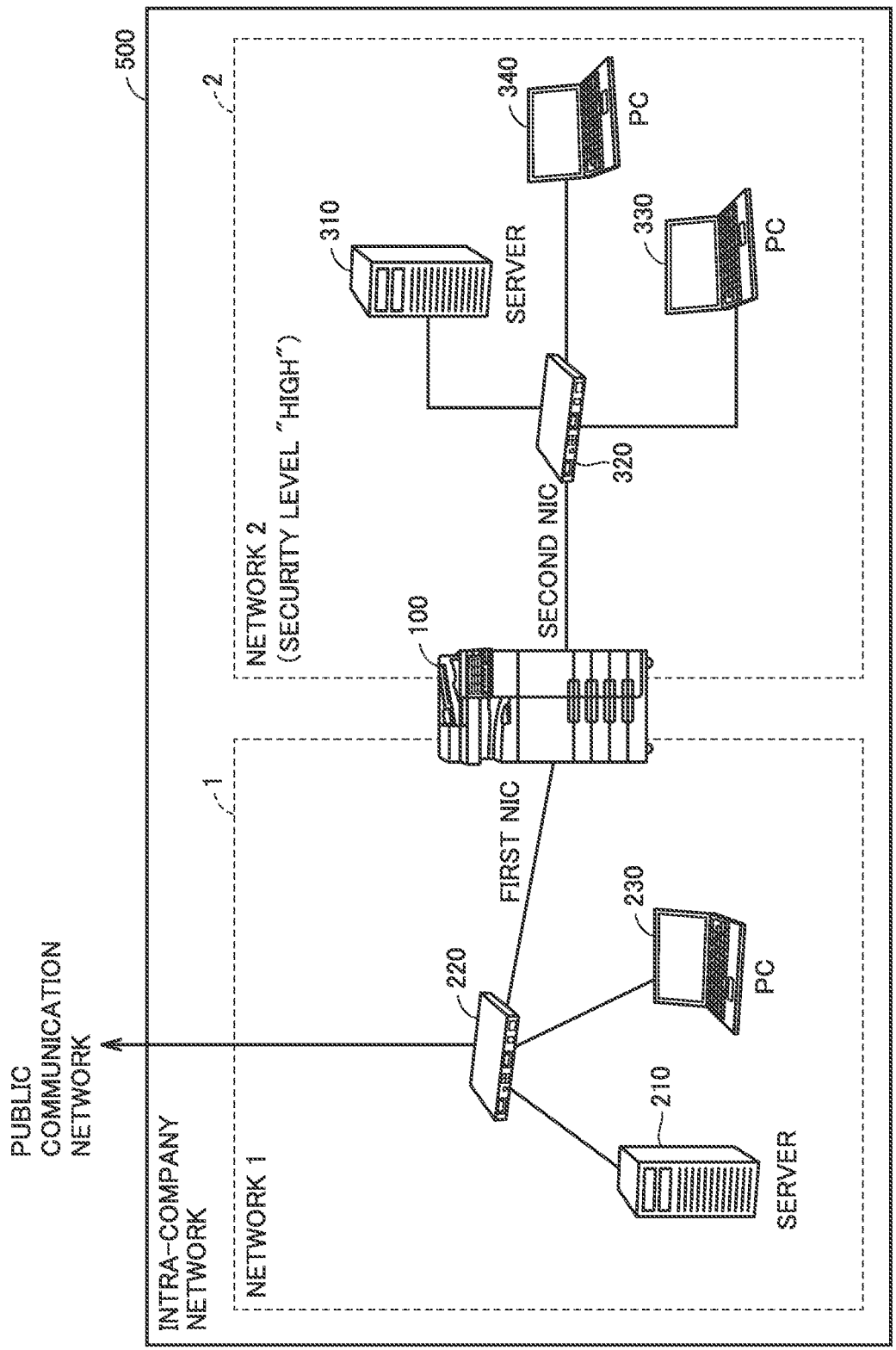
FIG. 1 shows one embodiment of a configuration of a network system.

Hereinafter, one or more embodiments of the present invention will be described with reference to the drawings. However, the scope of the invention is not limited to the disclosed embodiments.

The same elements and components in the description below have the same reference characters allotted and their labels and functions are also the same. Therefore, description thereof will not be repeated.

First Embodiment (1. Configuration of Network)

FIG. 1 is a diagram showing one embodiment of a configuration of a network system including an information processing apparatus. In the example in FIG. 1, a network system 500 implements an intra-company network. Network system 500 includes a network 1, a network 2, and an information processing apparatus 100 accessible from each of network 1 and network 2.

In the example in FIG. 1, information processing apparatus 100 is implemented by a multi-functional peripheral (MFP). Information processing apparatus 100 may be implemented by any computer so long as it includes a first network interface configured to accept access from a terminal on network 1, a second network interface configured to accept access from a terminal on network 2, a memory configured to store data transmitted from network 2, and a processor configured to process data stored in the memory.

Network 1 includes a server 210, a router 220, and a personal computer (PC) 230. Server 210 and PC 230 are connected to a public communication network such as the Internet and information processing apparatus 100 with router 220 being interposed.

Network 2 includes a server 310, a router 320, and two PCs 330 and 340. Server 310 and PCs 330 and 340 are connected to information processing apparatus 100 with router 320 being interposed.

Information processing apparatus 100 accepts access from a terminal on network 1 (in the example in FIG. 1, server 210 and PC 230) through a first network interface card (NIC). Information processing apparatus 100 accepts access from a terminal on network 2 (in the example in FIG. 1, server 310 and PCs 330 and 340) through a second NIC. The first NIC is shown as a first NIC 155 in FIG. 2. The second NIC is shown as a second NIC 156 in FIG. 2. Internet protocol (IP) addresses different from each other are allocated to the first NIC and the second NIC.

(2. Hardware Configuration of Information Processing Apparatus 100)

Figure 2:
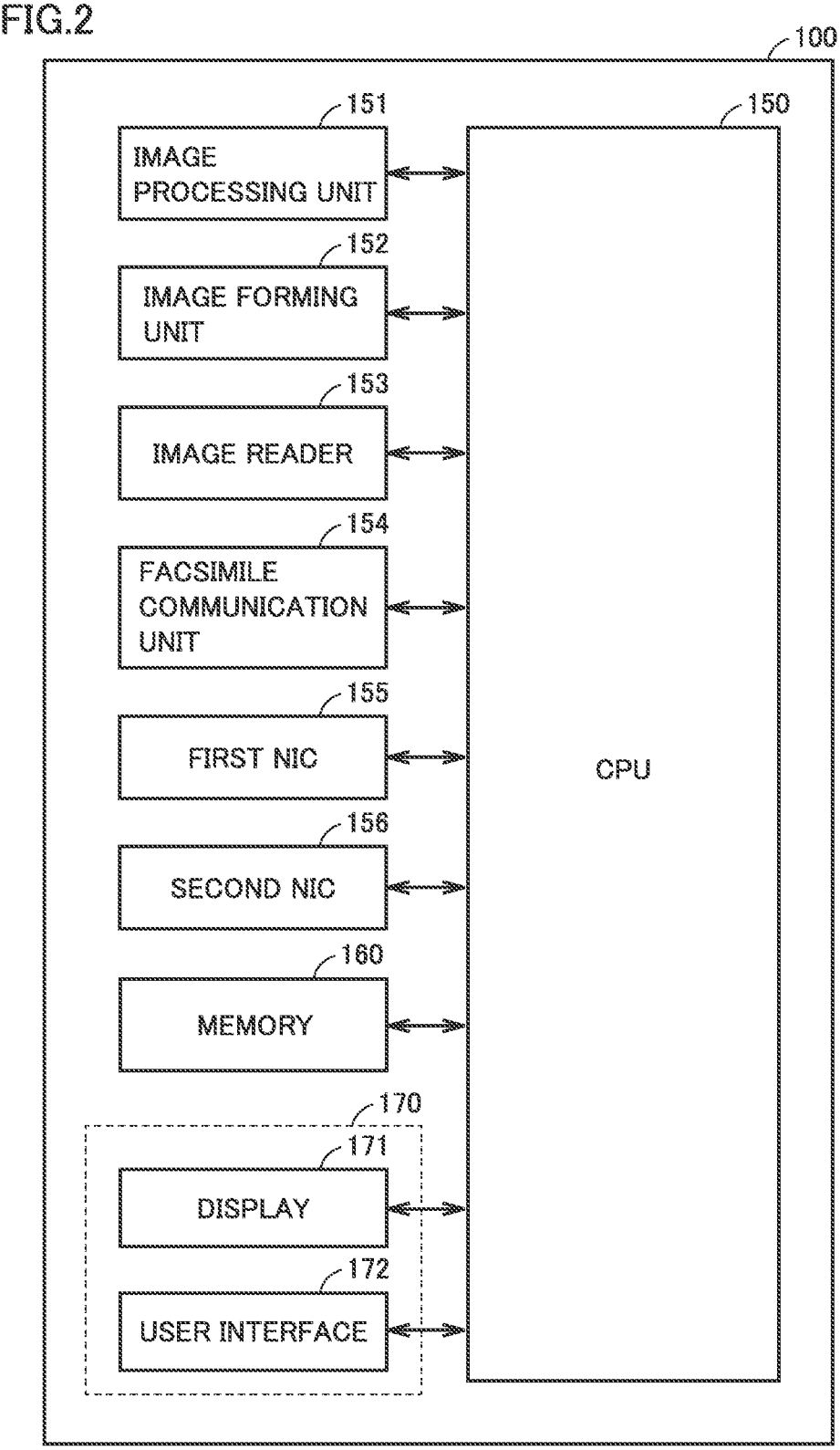
FIG. 2 schematically shows a hardware configuration of an information processing apparatus.

FIG. 2 is a diagram schematically showing a hardware configuration of information processing apparatus 100. Referring to FIG. 2, information processing apparatus 100 includes a central processing unit (CPU) 150 for controlling information processing apparatus 100, a memory 160 for storing a program and data, and a control panel 170.

Memory 160 stores a program to be executed by CPU 150 and various types of data and includes a non-volatile memory. Control panel 170 includes a display 171 and a user interface 172. Display 171 is implemented, for example, by a liquid crystal display and/or a plasma display. User interface 172 accepts input of an operation onto information processing apparatus 100 and it is implemented, for example, by a touch sensor and/or hardware buttons.

Information processing apparatus 100 further includes an image processing unit 151, an image forming unit 152, an image reader 153, a facsimile communication unit 154, first NIC 155, and second NIC 156. Image processing unit 151 performs various types of processing including scaling onto an input image. Image forming unit 152 includes an element for forming an image on recording paper such as a photoconductor. Image reader 153 includes an element for generating image data of a document such as a scanner and generates scan data by scanning a document. Facsimile communication unit 154 includes an element for transmitting and receiving image data through facsimile communication such as a modem.

(3. Setting of Security Level)

Figure 3:
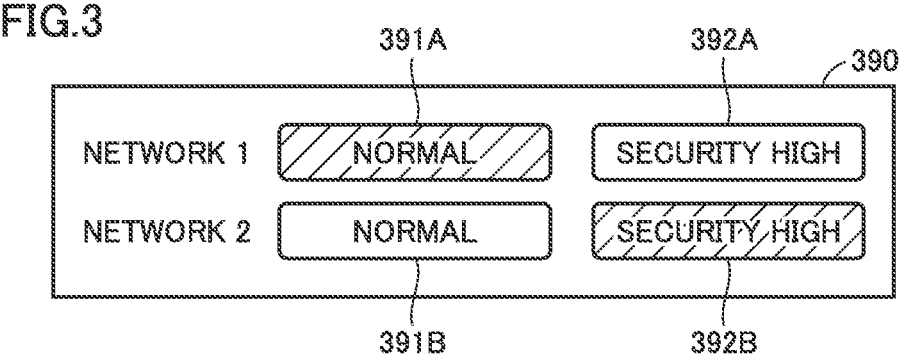
FIG. 3 shows one example of a screen for setting a security level.

Information processing apparatus 100 accepts setting of a security level for each of network 1 and network 2. FIG. 3 is a diagram showing one example of a screen for setting a security level shown on display 171. A screen 390 in FIG. 3 includes buttons 391A and 392A for setting a security level of network 1 to "normal" and "high", respectively. Screen 390 also includes buttons 391B and 392B for setting a security level of network 2 to "normal" and "high", respectively.

The example in FIG. 3 shows a state that button 391A and button 392B are selected. This state shows that the security level "normal" is set for network 1 and the security level "high" is set for network 2. In the example in FIG. 3, network 2 is higher in security level than network 1. Depending on a difference in security level, CPU 150 of information processing apparatus 100 has memory 160 store data received from a terminal on network 1 and data received from a terminal on network 2 in areas different from each other.

(4. Manner of Storage of Data in Accordance with Security Level)

Figure 4:
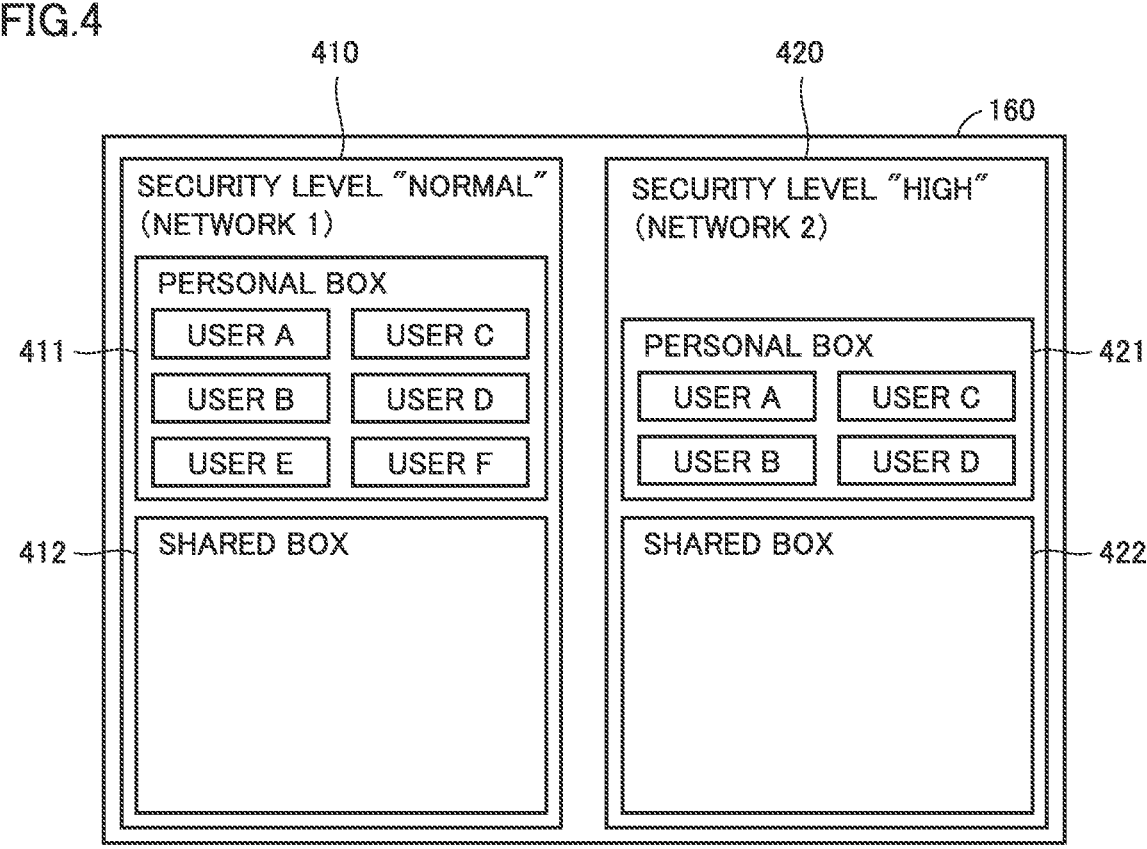
FIG. 4 is a diagram for illustrating a manner of storage of data in a memory.

FIG. 4 is a diagram for illustrating a manner of storage of data in memory 160. As shown in FIG. 4, a data area 410 and a data area 420 are set in memory 160. Data area 410 is an area for storing data received from a terminal on a network of which security level is "normal". Data area 420 is an area for storing data received from a terminal on a network of which security level is "high".

Data area 410 includes a personal BOX 411 for storing data of each of users A to F and a shared BOX 412 for storing data shared among the users. Data area 420 includes a personal BOX 421 for storing data of each of users A to D and a shared BOX 422 for storing data shared among the users.

In one embodiment, CPU 150 may have data stored in data area 410 without being encrypted and have data stored in data area 420 as being encrypted. CPU 150 may have a key for decryption of the encrypted data stored in a prescribed area in memory 160. CPU 150 may transmit the key to a terminal which is a data sender.

(5. Processing for Storing Data)

Figure 5:
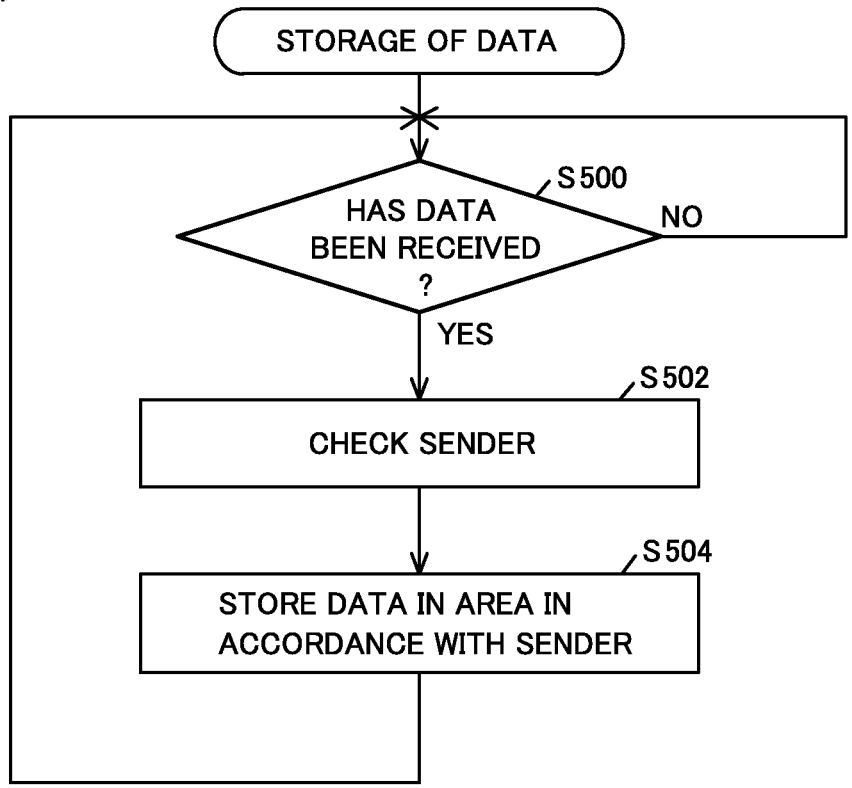
FIG. 5 is a flowchart of one example of processing performed for storing data in the memory.

FIG. 5 is a flowchart of one example of processing performed by CPU 150 for storing data in memory 160. A manner of storage of data by CPU 150 will be described with reference to FIG. 5. Processing herein is performed, for example, by execution of a given program by CPU 150.

In step S500, CPU 150 determines whether or not it has received data from a terminal on network 1 or network 2. CPU 150 receives data at first NIC 155 from a terminal on network 1. CPU 150 receives data at second NIC 156 from a terminal on network 2. CPU 150 has control remain at step S500 until it determines that it has received data (NO in step S500), and when CPU 150 determines that it has received data (YES in step S500), it allows control to proceed to step S502.

In step S502, CPU 150 checks a sender of the received data. A terminal on network 1 is the sender of data received at first NIC 155. A terminal on network 2 is the sender of data received at second NIC 156.

In step S504, CPU 150 has the received data stored in an area in accordance with the sender. More specifically, CPU 150 has the received data stored in area 410 when the terminal on network 1 is the sender. Further specifically, when CPU 150 is instructed to have the received data stored in a personal folder, CPU 150 has the data stored in an area of a corresponding user in personal BOX 411. When CPU 150 is instructed to have the received data stored in a shared folder, CPU 150 has the data stored in shared BOX 412.

Alternatively, CPU 150 has the received data stored in area 420 when the terminal on network 2 is the sender. Further specifically, when CPU 150 is instructed to have the received data stored in a personal folder, CPU 150 has the data stored in an area of a corresponding user in personal BOX 421. When CPU 150 is instructed to have the received data stored in a shared folder, CPU 150 has the data stored in shared BOX 422.

Thereafter, CPU 150 has control return to step S500.

(6. Control of Access to Data)

Figure 6:
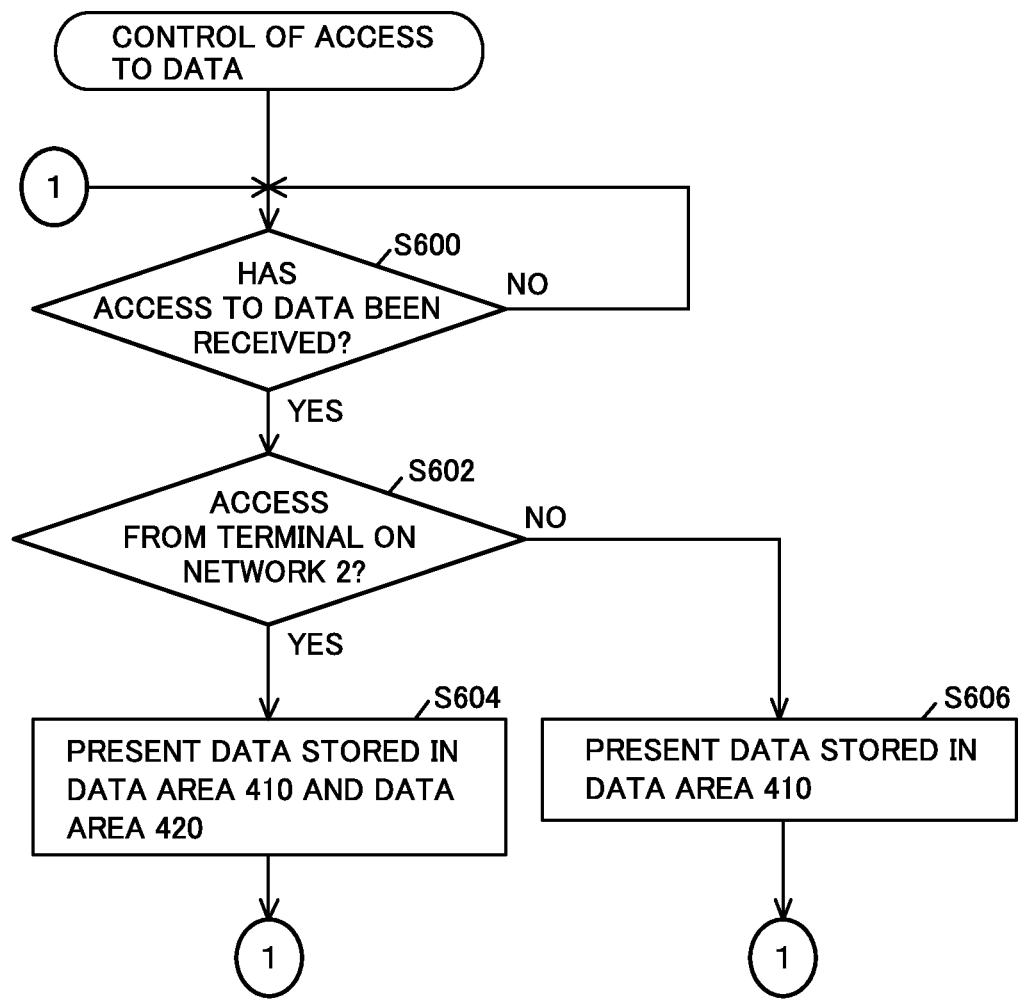
FIG. 6 is a flowchart showing one example of processing for controlling access to data stored in the memory.

FIG. 6 is a flowchart showing one example of processing for control by CPU 150 of access to data stored in memory 160. Control of access to data by CPU 150 will be described with reference to FIG. 6.

In step S600, CPU 150 determines whether or not it has accepted access to data in memory 160. CPU 150 has control remain at step S600 until it determines that it has accepted access to data (NO in step S600), and when CPU 150 determines that it has accepted access (YES in step S600), it allows control to proceed to step S602. Access to data includes a request for presenting a file stored in a designated storage area. For example, access to a prescribed folder includes a request for presenting a file stored in the prescribed folder.

In step S602, CPU 150 determines whether or not access received in step S600 has originated from a terminal on network 2. When CPU 150 determines that the access has originated from a terminal on network 2 (YES in step S602), CPU 150 allows control to proceed to step S604. When CPU 150 determines that the access has originated from a terminal on a network other than network 2 (in the example in FIG. 1, network 1) (NO in step S602), CPU 150 allows control to proceed to step S606.

In step S604, CPU 150 presents data stored in data area 410 and data area 420. Thereafter, CPU 150 has control return to step S600.

In step S606, CPU 150 presents data stored in data area 410. Thereafter, CPU 150 has control return to step S600.

As described above with reference to FIG. 6, when CPU 150 accepts access from a terminal on a network high in security level (network 2), it presents data in both of data area 410 and data area 420 in response to the access. A user who has accessed memory 160 from the terminal on network 2 thus recognizes presence of both of data in data area 410 and data in data area 420.

When CPU 150 accepts access from a terminal on a network low in security level (network 1), it presents only data in data area 410 in response to the access. A user who has accessed memory 160 from the terminal on network 1 can thus recognize presence of data in data area 410 whereas the user is unable to recognize presence of data in data area 420.

Figure 7:
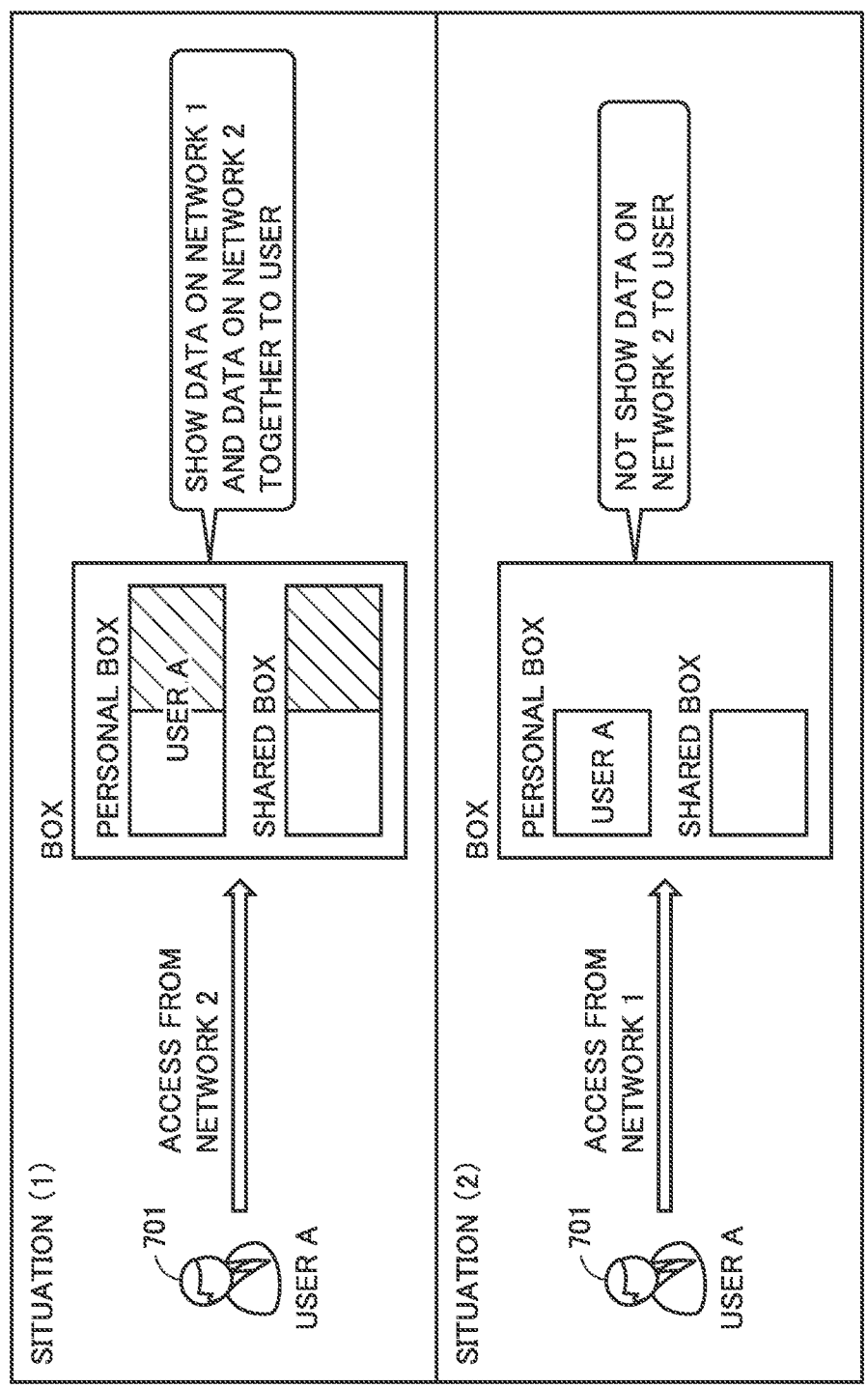
FIG. 7 is a diagram schematically showing one example of an effect by the processing in FIG. 6.

FIG. 7 is a diagram schematically showing one example of an effect by the processing in FIG. 6. FIG. 7 shows a situation (1) and a situation (2). FIG. 7 shows data without hatching and hatched data as data to be presented to a user. The data without hatching represents data stored in data area 410 (see FIG. 4). The hatched data represents data stored in data area 420 (see FIG. 4).

The situation (1) shows access by a user A (a user 701) to memory 160 from a terminal on network 2. In the situation (1), data stored in both of area 410 and area 420 among data which can be viewed by user A are presented.

The situation (2) shows access by user A to memory 160 from a terminal on network 1. In the situation (2), only data stored in area 410 among data which can be viewed by user A is presented to user A (user 701) and data stored in area 420 is not presented.

(7. Transmission of Data Stored in Memory to Terminal)

Figure 8:
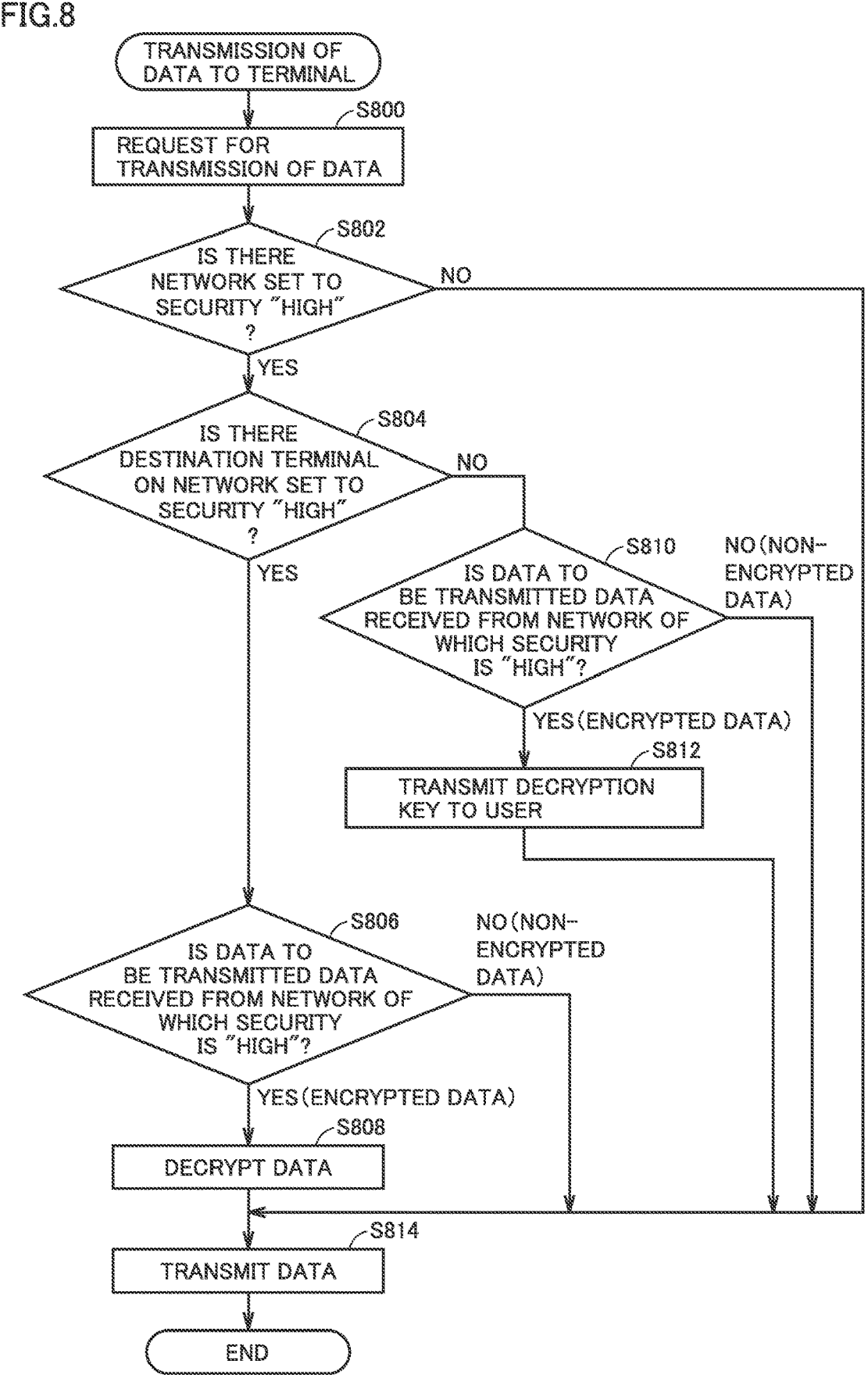
FIG. 8 is a flowchart of one example of processing performed for transmitting data in the memory to a terminal.

FIG. 8 is a flowchart of one example of processing performed by CPU 150 for transmitting data in memory 160 to a terminal. Transmission of data from information processing apparatus 100 to a terminal in network system 500 will be described with reference to FIG. 8.

In step S800, CPU 150 accepts a request for transmission of data to a terminal. A request from a certain terminal for downloading data to the terminal represents one example of a request for transmission of data to the terminal In this case, a destination terminal is a terminal which has issued a request for transmission of data. In another example, a request for transmission of data from a certain terminal to another terminal is issued. In this case, a destination terminal is "another terminal."

In step S802, CPU 150 determines whether or not there is a network of which security level is set to "high" in network system 500. When CPU 150 determines that there is a network of which security level is set to "high" (YES in step S802), CPU 150 allows control to proceed to step S804. When CPU 150 determines that there is no network of which security level is set to "high" (NO in step S802), CPU 150 allows control to proceed to step S814. For example, when the security level of network 2 is set to "high" as shown in FIG. 1, control proceeds to step S804.

In step S804, CPU 150 determines whether or not a destination terminal is a terminal of which security level is "high". When CPU 150 determines that the destination terminal is a terminal of which security level is "high" (YES in step S804), CPU 150 allows control to proceed to step S806. When CPU 150 determines that the destination terminal is not a terminal of which security level is "high" (NO in step S804), CPU 150 allows control to proceed to step S810.

In step S806, CPU 150 determines whether or not data to be transmitted is data received from a terminal of which security level is "high". When CPU 150 determines that the data to be transmitted is data received from a terminal of which security level is "high" (YES in step S806), CPU 150 allows control to proceed to step S808, and otherwise (NO in step S806), it allows control to proceed to step S814.

In the present embodiment, data received from a terminal of which security level is "high" is stored in an area for the security level "high" (data area 420 in FIG. 4) as described with reference to FIG. 4. Data may be stored in data area 420 as being encrypted.

In step S808, CPU 150 decrypts data in data area 420 and has the data stored in a temporary storage area in memory 160. Thereafter, control proceeds to step S814.

In step S810, whether or not data to be transmitted is data received from a terminal of which security level is "high" is determined. When CPU 150 determines that the data to be transmitted is data received from a terminal of which security level is "high" (YES in step S810), CPU 150 allows control to proceed to step S812, and otherwise (NO in step S810), control proceeds to step S814.

In step S812, CPU 150 transmits a key for decrypting data to be transmitted to a destination terminal Thereafter, control proceeds to step S814.

In step S814, CPU 150 transmits data to be transmitted to a terminal designated as the destination. When CPU 150 decrypts data in step S808, CPU 150 transmits the decrypted data in step S814.

According to the processing in FIG. 8 above, when data to be transmitted is data in data area 420, CPU 150 performs a different procedure depending on whether or not a destination terminal belongs to a network of which security level is "high". More specifically, when a destination terminal belongs to a network of which security level is "high", CPU 150 transmits data to be transmitted to that terminal as being decrypted (steps S808 and S814).

When a destination terminal belongs to a network at a security level other than the security level "high", CPU 150 transmits a key for decrypting the data to be transmitted to that terminal (step S812), and thereafter transmits the data to be transmitted (which has been encrypted) to that terminal (step S814). CPU 150 may transmit a key for decrypting data to be transmitted, subsequent to transmission of that data.

Figure 9:
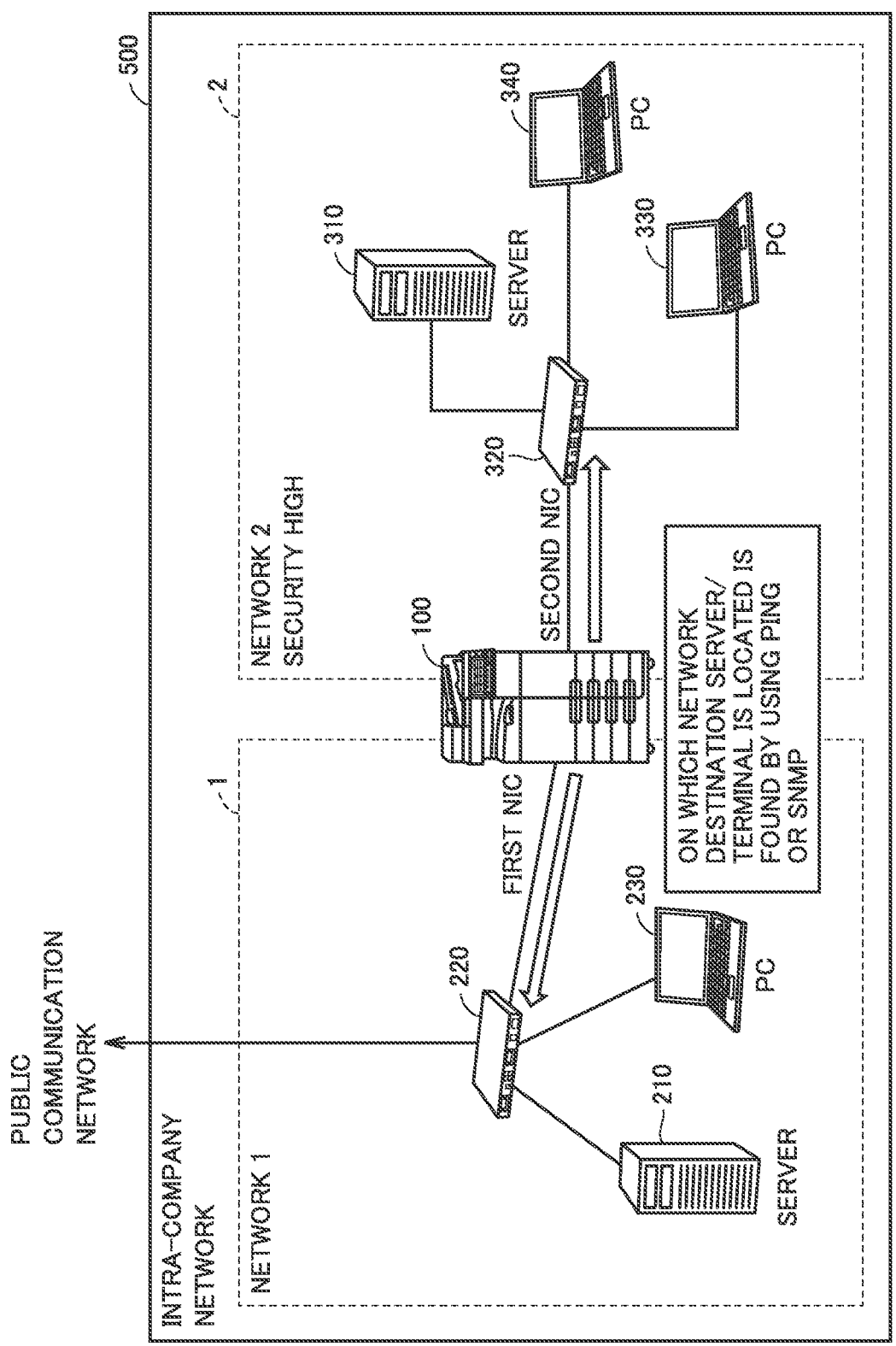
FIG. 9 is a diagram for illustrating one example of determination in step S804.

FIG. 9 is a diagram for illustrating one example of determination made in step S804 by CPU 150. In the example in FIG. 9, CPU 150 inquires of a destination terminal about a network to which the terminal belongs by using a simple network management protocol (SNMP) command or a Ping command Memory 160 stores setting of a security level of each network in network system 500. CPU 150 determines to which network the destination terminal belongs by using a reply to the inquiry from the sender terminal and determines whether or not the security level of the network to which each terminal belongs is "high" based on a result of determination. Determination in step S804 is made based on that determination.

Second Embodiment (1) Storage of Data in Accordance with Setting as to Whether or not Access is Permitted In the network system in a second embodiment, CPU 150 of information processing apparatus 100 determines a manner of storage of data received from a terminal on a network of which security level is "high" in accordance with an instruction from that terminal.

Figure 10:
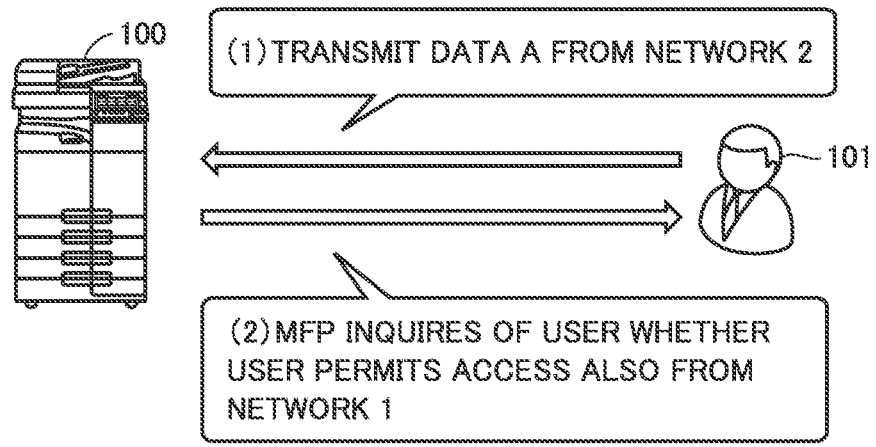
FIG. 10 is a diagram showing one example of a situation at the time of transmission of data from a terminal to an information processing apparatus in a second embodiment.

FIG. 10 is a diagram showing one example of a situation at the time of transmission of data from a terminal to information processing apparatus 100 in the second embodiment. FIG. 10 shows a step (1) and a step (2).

In the step (1), a user 101 transmits data to information processing apparatus 100 (by using a terminal) When a terminal which is a sender of data belongs to a network of which security level is "normal", CPU 150 has the data stored in data area 410 (FIG. 4). When the sender belongs to the security level "high", CPU 150 performs the step (2).

In the step (2), CPU 150 inquires of (a terminal used by) user 101 whether or not to permit access to the transmitted data by a terminal on a network of which security level is "normal".

Figure 11:
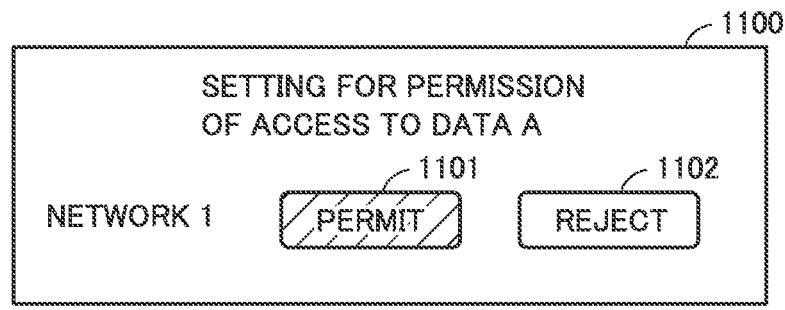
FIG. 11 is a diagram showing one example of a screen shown in connection with an inquiry.

FIG. 11 is a diagram showing one example of a screen shown in connection with the inquiry. A screen 1100 in FIG. 11 includes a button 1101 for permitting access and a button 1102 for rejecting access. A user of a terminal operates button 1101 or button 1102. CPU 150 determines a manner of storage of transmitted data in accordance with the operated button.

More specifically, when button 1102 is operated (access being rejected), CPU 150 has transmitted data stored in data area 420. CPU 150 may have the data stored after it encrypts the data.

When button 1101 is operated (access being permitted), CPU 150 has transmitted data stored in data area 420 and further has the data stored in data area 410. CPU 150 may have the data stored in data area 420 after it encrypts the data. When CPU 150 has the data stored in data area 410, it has the data stored after it encrypts the data. CPU 150 has a key for decrypting encrypted data stored in memory 160. CPU 150 may transmit the key to a terminal which is a sender of data and/or a terminal of a manager of the network.

Figure 12:
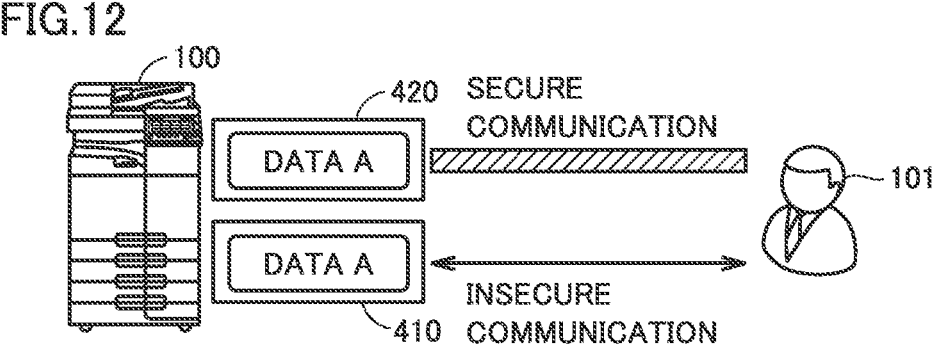
FIG. 12 is a diagram for illustrating a manner of access to data stored in a data area.

FIG. 12 is a diagram for illustrating a manner of access to data stored in data area 410 and data area 420. In FIG. 12, data transmitted from a network of which security level is "high" is shown as "data A." Data A is stored in both of data area 410 and data area 420. In data area 410, data A has been encrypted.

Data area 420 is an area for data received from a terminal of which security level is "high". Therefore, though CPU 150 accepts access from network 2 to data in data area 420, it does not accept access thereto from network 1. "Data A" in data area 420 is thus accessed through secure communication (communication between network 2 and information processing apparatus 100).

Data area 410 is an area for data received from a terminal of which security level is "normal." Therefore, CPU 150 accepts access from both of network 1 and network 2 to data in data area 410. Therefore, "data A" in data area 410 can be accessed also through insecure communication (communication between network 1 and information processing apparatus 100).

"Data A" in data area 410 has been encrypted. A user who accesses "data A" from network 1 separately obtains a key for decrypting data A. The network system thus ensures security of "data A" and accepts access to "data A" from network 1.

(2) Setting of Security Level of Data

When CPU 150 receives data from a terminal on a network of which security level is "high", it may accept designation of the security level of the data. When the security level "high" of that data is designated, CPU 150 has the data stored in data area 420 as described with reference to FIG. 12, and further has the data stored in data area 410 as being encrypted. When the security level "normal" of the data is designated, CPU 150 has the data stored in data area 420 and further has the data stored in data area 410 without encrypting the data. CPU 150 operates as below in response to an instruction to erase the data.

When an instruction to erase data stored in data area 420 is given, CPU 150 erases the data stored in data area 420 and data in data area 410 corresponding to that data. When an instruction to erase data stored in data area 410 is given, CPU 150 erases only data stored in data area 410 and does not erase data stored in data area 420.

Third Embodiment

In a third embodiment, information processing apparatus 100 receives a print job. The received print job is stored in information processing apparatus 100. The print job stored in information processing apparatus 100 may be executed in information processing apparatus 100 or in another image forming apparatus. When the print job is executed in another image forming apparatus, the print job is transferred from information processing apparatus 100 to another image forming apparatus.

Figure 13:
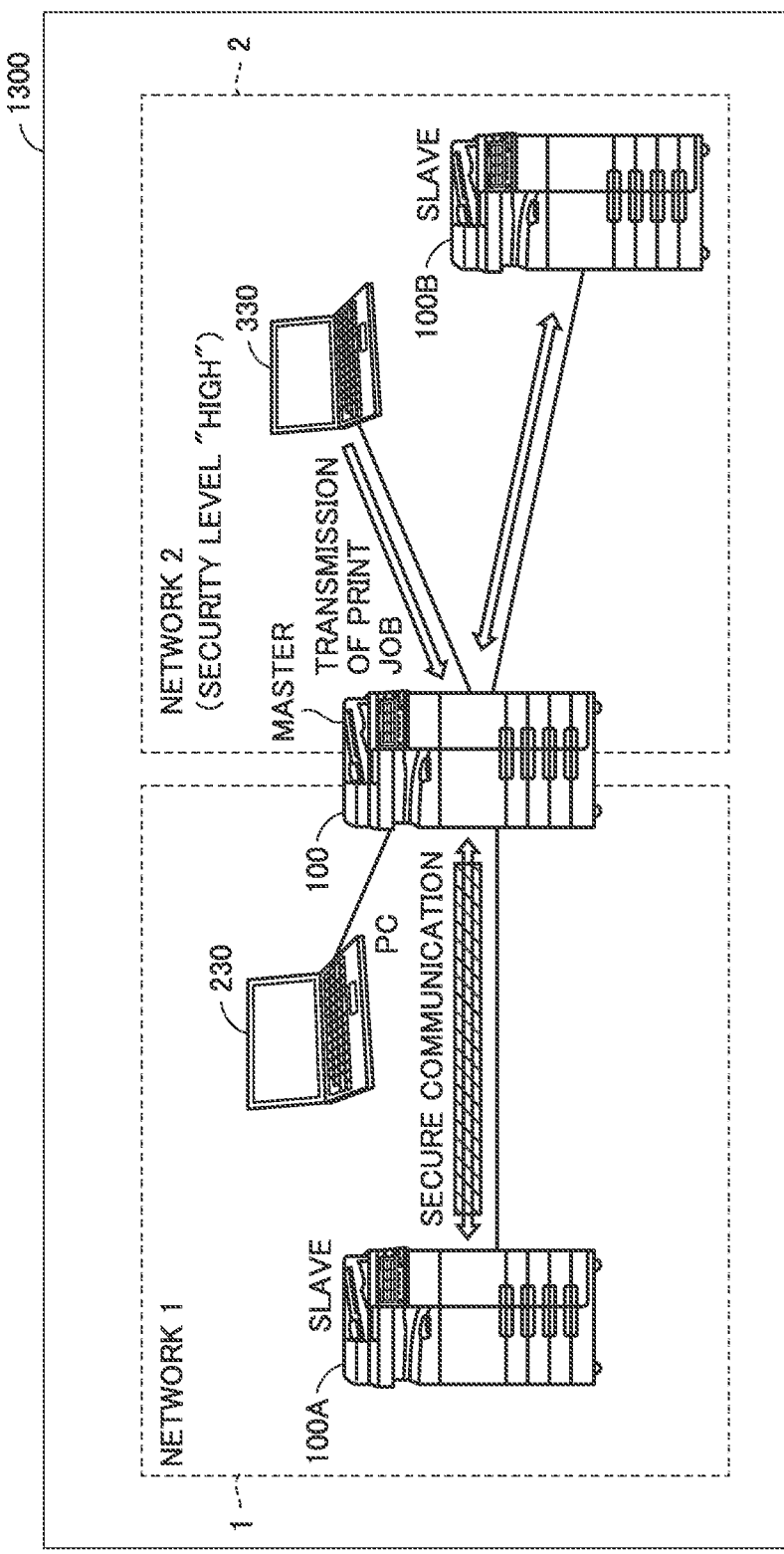
FIGS. 13 and 14 are diagrams each showing one embodiment of a configuration of the network system.

FIG. 13 is a diagram showing one embodiment of a configuration of a network system including an information processing apparatus. A network system 1300 in FIG. 13 includes network 1 of which security level is set to "normal", network 2 of which security level is set to "high", and information processing apparatus 100 accessible from network 1 and network 2. Network 1 includes PC 230 and an MFP 100A. Network 2 includes PC 330 and an MFP 100B.

MFPs 100A and 100B are identical in hardware structure to information processing apparatus 100 described with reference to FIG. 2. In executing a print job, in network system 1300, information processing apparatus 100 functions as a master and MFPs 100A and 100B function as slaves.

In network system 1300 in FIG. 13, PC 330 transmits a print job to information processing apparatus 100. When CPU 150 of information processing apparatus 100 receives the print job, it has the print job temporarily stored in memory 160. Since the print job has been transmitted from the terminal of which security level is "high", CPU 150 has the print job temporarily saved after it encrypts the print job. When the print job has been transmitted from a terminal of which security level is "normal", CPU 150 has the print job temporarily saved without encrypting the print job.

Information processing apparatus 100 executes the print job by forming an image in accordance with the print job on recording paper by image forming unit 152. When CPU 150 receives an instruction to execute the print job, CPU 150 decrypts the print job encrypted as above and thereafter executes the print job.

When the print job stored in information processing apparatus 100 is executed in another image forming apparatus, handling of data in the print job is different depending on whether the print job is executed in an image forming apparatus on network 1 (of which security level is "normal") or an image forming apparatus on network 2 (of which security level is "high"). Each case will be described below.

(1) Execution of Print Job by Image Forming Apparatus on Network 2

When a user inputs a prescribed instruction to MFP 100B, a CPU of MFP 100B transmits information on the user (for example, a user ID) to information processing apparatus 100. In response, CPU 150 of information processing apparatus 100 transmits a list of print jobs linked to the information on the user to MFP 100B.

The CPU of MFP 100B has the list of the print jobs shown on a display of MFP 100B. The user selects a print job of which execution is desired by the user from the list. The CPU of MFP 100B transmits information representing which print job has been selected to information processing apparatus 100.

CPU 150 of information processing apparatus 100 determines whether MFP 100B belongs to network 1 or network 2. CPU 150 makes determination, for example, by using an SNMP command or a Ping command.

In the example in FIG. 13, MFP 100B belongs to network 2. In response, CPU 150 decrypts the print job and transmits the decrypted print job to MFP 100B. Thus, the print job as being decrypted is transmitted to MFP 100B. MFP 100B executes the print job.

(2) Execution of Print Job by Image Forming Apparatus on Network 1

When a user inputs a prescribed instruction to MFP 100A, a CPU of MFP 100A transmits information on the user (for example, a user ID) to information processing apparatus 100. In response, CPU 150 of information processing apparatus 100 transmits a list of print jobs linked to the information on the user to MFP 100A.

The CPU of MFP 100A has the list of the print jobs shown on a display of MFP 100A. The user selects a print job of which execution is desired by the user from the list. The CPU of MFP 100A transmits information representing which print job has been selected to information processing apparatus 100.

CPU 150 of information processing apparatus 100 determines whether the selected print job has been transmitted from a terminal on network 2. CPU 150 determines whether MFP 100A belongs to network 1 or network 2. CPU 150 makes determination, for example, by using an SNMP command or a Ping command.

It is assumed here that the selected print job has been transmitted from a terminal on network 2. In the example in FIG. 13, MFP 100A belongs to network 1, not to network 2. In response, CPU 150 transmits a print job which remains encrypted to MFP 100A. The user of MFP 100A obtains a key for decrypting the print job and inputs the key to MFP 100A. In response to input of the key, MFP 100A decrypts the print job and thereafter executes the print job.

In the third embodiment described above, information processing apparatus 100 stores a print job received from a terminal on network 2 as being encrypted. When the print job is executed in an image forming apparatus on network 2, information processing apparatus 100 decrypts the print job and thereafter transmits the decrypted print job to the image forming apparatus. When the print job is executed in an image forming apparatus on network 1, information processing apparatus 100 transmits the print job which remains encrypted to the image forming apparatus.

Fourth Embodiment

A fourth embodiment relates to handling of data uploaded from a network system to a server such as a cloud server.

Figure 14:
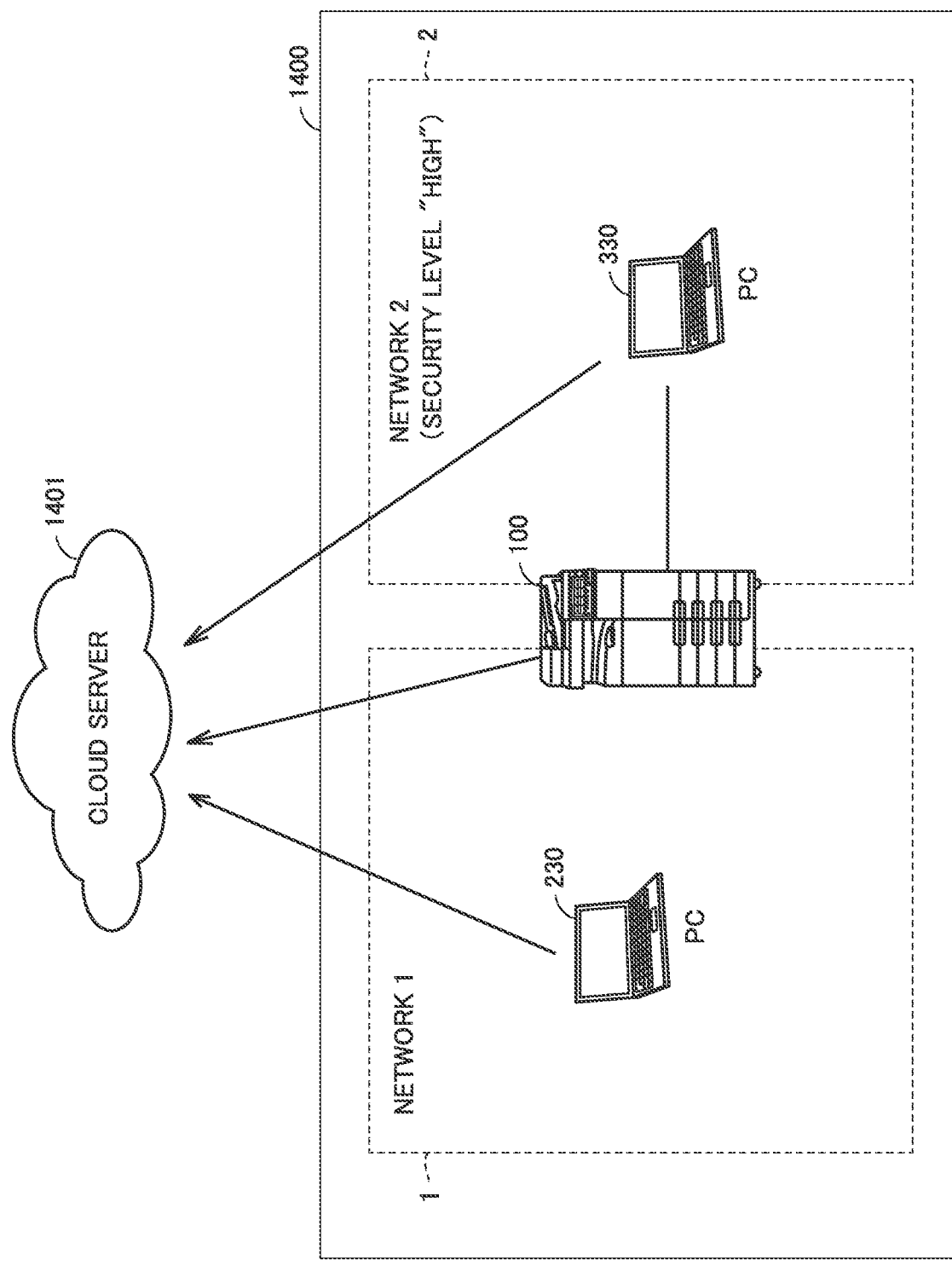

FIG. 14 is a diagram showing one embodiment of a configuration of a network system including an information processing apparatus. A network system 1400 in FIG. 14 includes network 1 of which security level is set to "normal", network 2 of which security level is set to "high", and information processing apparatus 100 accessible from network 1 and network 2.

Information processing apparatus 100 can communicate with a cloud server 1401. Network 1 includes PC 230. Network 2 includes PC 330.

Information processing apparatus 100 uploads data to cloud server 1401. For example, data generated by a scanning operation by information processing apparatus 100 is uploaded. In the example in FIG. 14, a user sets the security level "high" for the scanning operation by information processing apparatus 100. In response, CPU 150 of information processing apparatus 100 encrypts the data and thereafter uploads the encrypted data to cloud server 1401. CPU 150 has a key for decrypting the data stored in memory 160.

When cloud server 1401 receives a request for downloading of the data, it transmits information on a terminal which has issued a request for downloading to information processing apparatus 100.

CPU 150 determines whether or not the terminal which has issued a request for downloading is a terminal on network 2. For this determination, CPU 150 obtains identification information of the terminal which has issued a request for downloading, for example, from cloud server 1401. In addition, CPU 150 issues a request for identification information to each terminal on network 2 by using a Ping command or an SNMP command. When the identification information of the terminal which has issued a request for downloading matches with identification information of any of terminals on network 2, CPU 150 determines that the terminal which has issued a request for downloading is a terminal on network 2. When the identification information of the terminal which has issued a request for downloading does not match with identification information of any of terminals on network 2, CPU 150 determines that the terminal which has issued a request for downloading is not a terminal on network 2.

When CPU 150 determines that the terminal which has issued a request for downloading is not a terminal on network 2, it gives a response to that effect to cloud server 1401. In response to that response, cloud server 1401 transmits requested data which remains encrypted to the terminal which has issued the request. For example, when terminal 230 has issued a request for downloading, it is determined that the terminal which has issued the request is not a terminal on network 2. Cloud server 1401 transmits data which remains encrypted to terminal 230. A user of terminal 230 should obtain a decryption key through a different path. The user decrypts the data on terminal 230 by using that key.

When CPU 150 determines that the terminal which has issued a request for downloading is a terminal on network 2, it gives a response to that effect to cloud server 1401. In response to that response, cloud server 1401 transmits requested data to information processing apparatus 100. CPU 150 of information processing apparatus 100 decrypts the data and uploads again the data to cloud server 1401. Cloud server 1401 transmits the decrypted data to the terminal which has issued the request. For example, when terminal 330 has issued a request for downloading, it is determined that a terminal on network 2 is the terminal which has issued the request. Cloud server 1401 transmits the decrypted data to terminal 330. A user of terminal 330 can thus recognize contents of the data without a decryption key.

In a certain modification, when it is determined that a terminal on network 2 has issued a request for downloading, CPU 150 may directly transmit decrypted data to the terminal which has issued the request, without uploading again the data to cloud server 1401.

In another modification, when it is determined that a terminal on network 2 has issued a request for downloading, CPU 150 may directly transmit a decryption key to the terminal which has issued the request. Cloud server 1401 transmits encrypted data to the terminal which has issued the request. The terminal which has issued the request decrypts the data transmitted from cloud server 1401 by using the decryption key transmitted from information processing apparatus 100.

Fifth Embodiment

A fifth embodiment relates to change in security level of a network in the network system. More specifically, the fifth embodiment relates to handling of data received from network 2 when the security level of network 2 is changed from "high" to "normal". Two examples of handling of data in such a case will be described below.

(1) Example A (FIGS. 15 to 18)

In the first to fourth embodiments, the security level "high" is set for network 2. This setting is changed to the security level "normal" in an example A.

Figure 15:
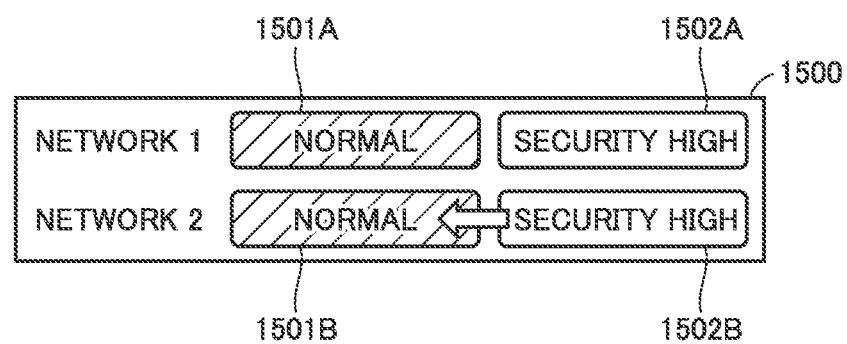
FIG. 15 shows a screen for inputting change in security level.

FIG. 15 shows a screen for inputting change in security level. CPU 150 of information processing apparatus 100 has display 171 show a screen 1500 in FIG. 15 in accordance with a given operation. Screen 1500 in FIG. 15 includes buttons 1501A and 1502A for setting the security level of network 1 to "normal" and "high", respectively. Screen 1500 includes buttons 1501B and 1502B for setting the security level of network 2 to "normal" and "high", respectively.

The example in FIG. 15 shows that button 1501A and button 1501B are selected. This state indicates that the security level "normal" is set for both of network 1 and network 2.

In the first to fourth embodiments, the security level of network 2 is set to "high". When the security level of network 2 is changed from "high" to "normal", CPU 150 moves data of each user in personal BOX 421 to a folder of a corresponding user in personal BOX 411.

Figure 16:
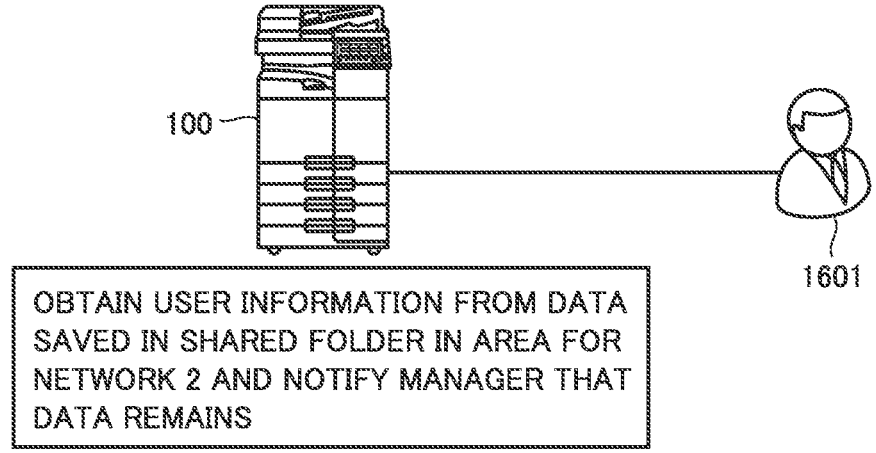
FIG. 16 is a diagram for illustrating an operation by the information processing apparatus when the security level is changed.

FIG. 16 is a diagram for illustrating an operation by information processing apparatus 100 when the security level is changed. CPU 150 inquires of a manager (a user 1601 in FIG. 16) of network 2 about handling of data in shared BOX 422. More specifically, for example, CPU 150 transmits inquiry information to a terminal associated with user 1601.

Figure 17:
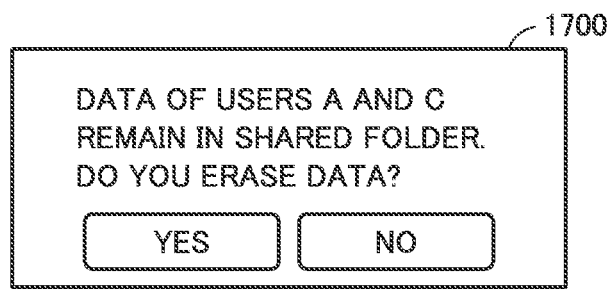
FIG. 17 is a diagram showing one example of information transmitted for making an inquiry about handling of data in a shared BOX.

FIG. 17 is a diagram showing one example of information transmitted for making an inquiry about handling of data in shared BOX 422. In response to the inquiry, a terminal of the manager (user 1601) shows, for example, a screen 1700 in FIG. 17. Screen 1700 makes an inquiry about whether or not data in shared BOX 422 may be erased. The manager (user 1601) answers to the inquiry by operating a "YES" button or a "NO" button in screen 1700.

In one example, when the "YES" button is operated, CPU 150 of information processing apparatus 100 erases data in shared BOX 422. When the "NO" button is operated, CPU 150 discards an instruction to change the security level of network 2. Namely, the security level "high" of network 2 is maintained In this case, movement of data from personal BOX 421 to personal BOX 411 described above is undone.

Figure 18:
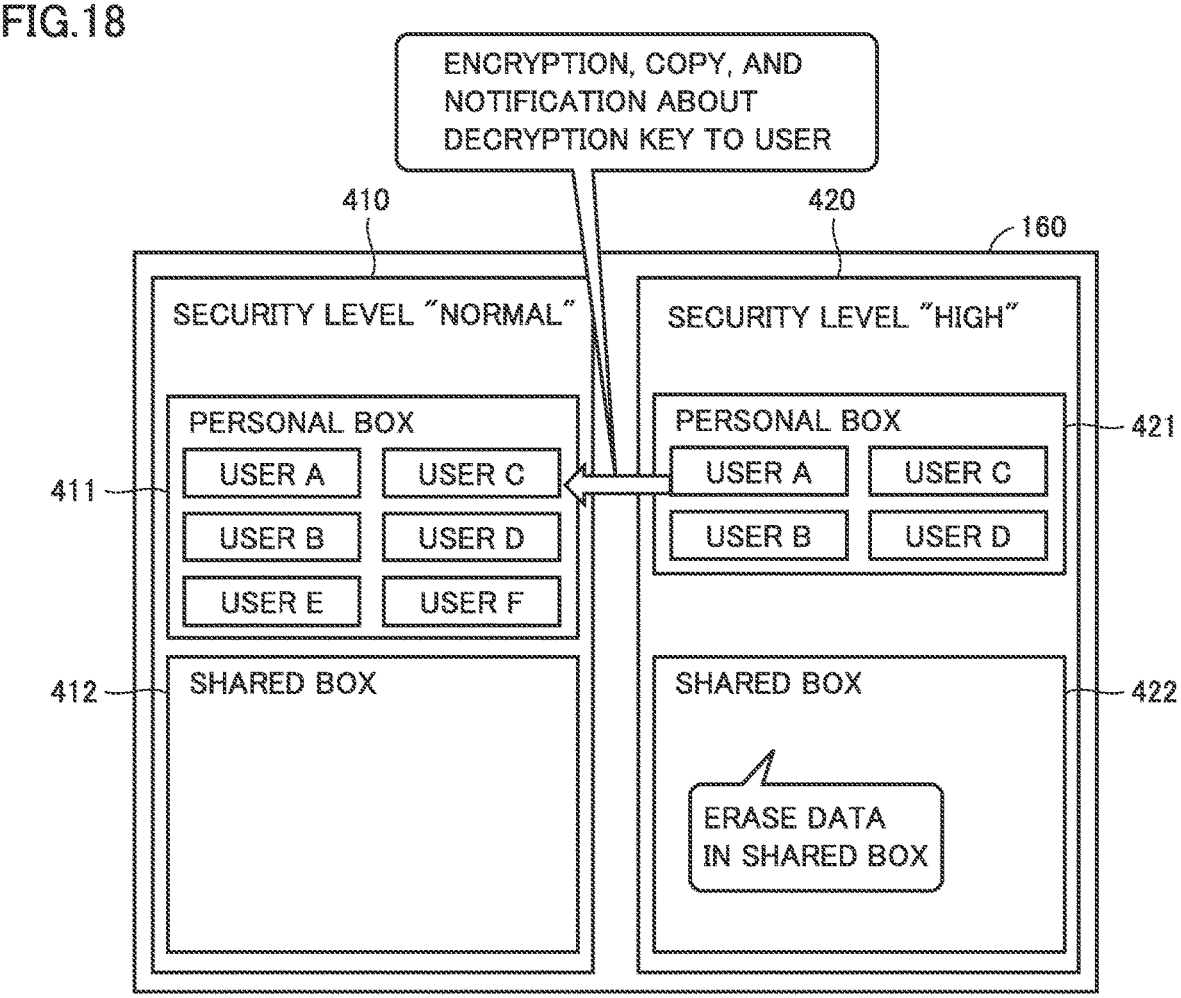
FIG. 18 is a diagram showing handling of data in another example.

FIG. 18 is a diagram showing handling of data in another example. In another example, when the "YES" button is operated, CPU 150 erases data in shared BOX 422. Furthermore, CPU 150 specifies a user to which each piece of data corresponds. CPU 150 then encrypts each piece of data and has the data stored in a folder corresponding to each user in shared BOX 411. CPU 150 transmits a key for decrypting encrypted data to the user specified for each piece of data. In this example as well, when the "NO" button is operated, CPU 150 discards an instruction to change the security level of network 2. Namely, the security level "high" of network 2 is maintained In this case, movement of data from personal BOX 421 to personal BOX 411 described above is undone.

(2) Example B (FIGS. 19 to 23)

In an example B, the security level of network 2 is changed from "high" to "normal" and the security level of network 1 is changed from "normal" to "high".

Figure 19:
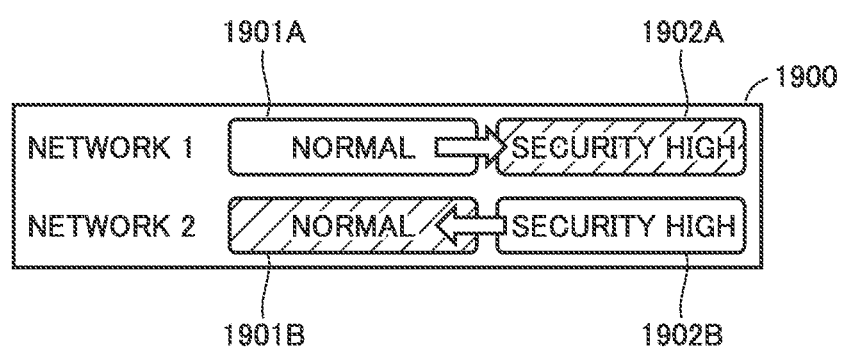
FIG. 19 shows a screen for inputting change in security level.

FIG. 19 shows a screen for inputting change in security level. CPU 150 of information processing apparatus 100 has display 171 show a screen 1900 in FIG. 19 in accordance with a given operation. Screen 1900 includes buttons 1901A and 1902A for setting the security level of network 1 to "normal" and "high", respectively. Screen 1900 includes buttons 1901B and 1902B for setting the security level of network 2 to "normal" and "high", respectively.

A user inputs the security level of each of network 1 and network 2 in screen 1900. In the example in FIG. 19, button 1902A of buttons 1901A and 1902A is selected in screen 1900. The security level "high" is thus input for network 1. In the example in FIG. 19, button 1901B of buttons 1901B and 1902B is selected in screen 1900. The security level "normal" is thus input for network 2.

When the security level of network 2 is changed from "high" to "normal", CPU 150 moves data of each user in personal BOX 421 to a folder of a corresponding user in personal BOX 411.

Figure 20:
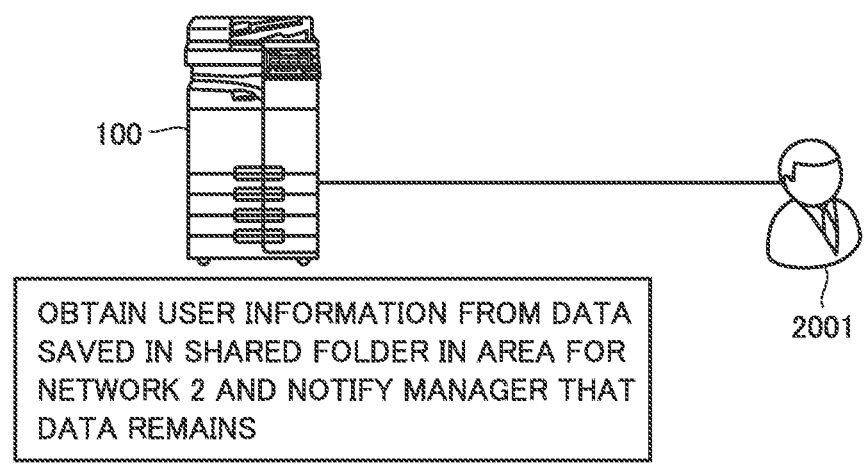
FIG. 20 is a diagram for illustrating an operation by the information processing apparatus onto data stored in the shared BOX when the security level is changed.

FIG. 20 is a diagram for illustrating an operation by information processing apparatus 100 onto data stored in shared BOX 422 when the security level is changed. CPU 150 inquires of a manager (a user 2001 in FIG. 20) of network 2 about handling of data in shared BOX 422. More specifically, for example, CPU 150 transmits inquiry information to a terminal associated with user 2001.

Figure 21:
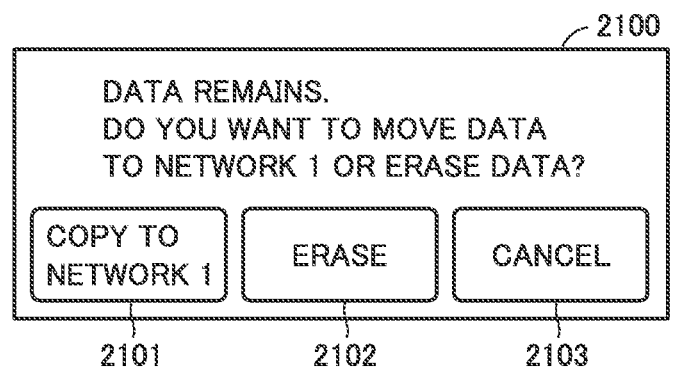
FIG. 21 is a diagram showing one example of information transmitted for making an inquiry about handling of data in the shared BOX.

FIG. 21 is a diagram showing one example of information transmitted for making an inquiry about handling of data in shared BOX 422. For example, a screen 2100 in FIG. 21 is shown on a terminal of the manager (user 2001). Screen 2100 includes a button (buttons 2101, 2102, and 2103) for accepting designation of any of three menus of "copy to network 1," "erase", and "cancel" as to handling of data in shared BOX 422. The manager (user 2001) answers to the inquiry by operating any of buttons 2101, 2102, and 2103 in screen 2100.

Figure 22:
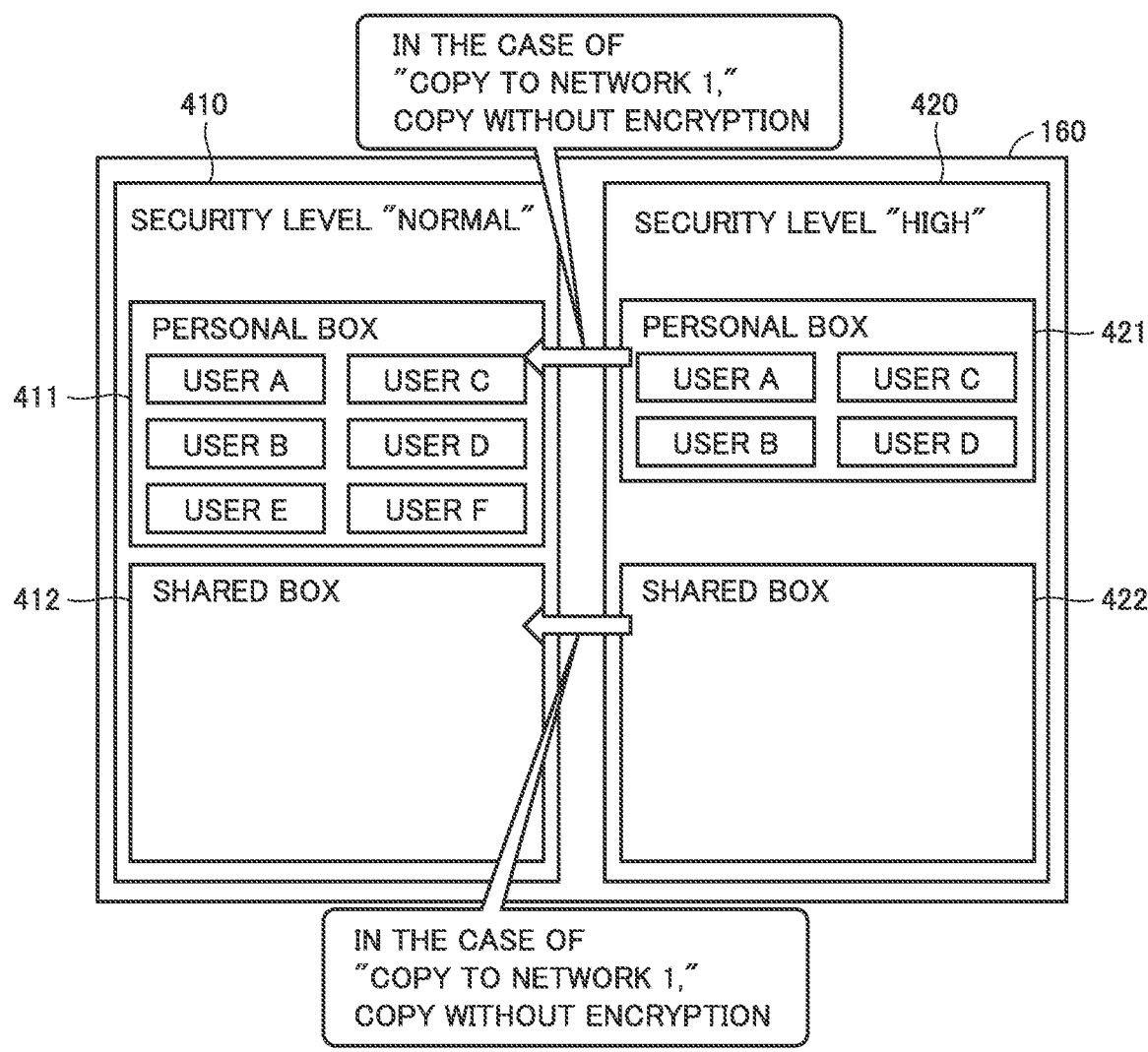
FIG. 22 is a diagram for illustrating handling of data when "copy to network 1" is designated.

FIG. 22 is a diagram for illustrating handling of data when button 2101 is operated (when "copy to network 1" is designated). As shown in FIG. 22, CPU 150 copies data of each user in personal BOX 421 to a folder of each corresponding user in personal BOX 411. CPU 150 copies data in shared BOX 422 to shared BOX 412. Data in personal BOX 421 and data in shared BOX 422 are copied to personal BOX 411 and shared BOX 412, respectively, without being encrypted. Thereafter, data in personal BOX 421 and data in shared BOX 422 are erased.

Figure 23:
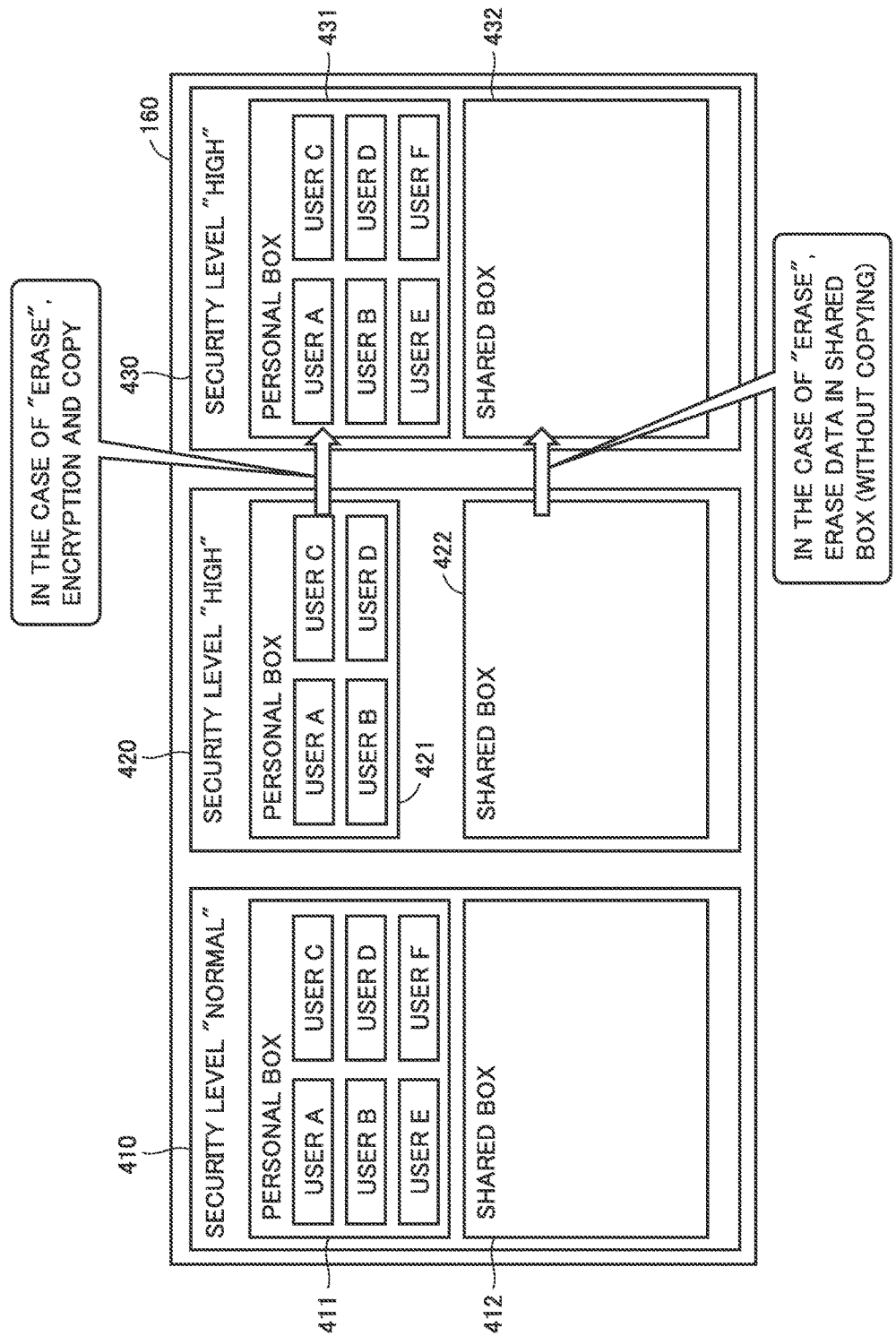
FIG. 23 is a diagram for illustrating handling of data when "erase" is designated.

FIG. 23 is a diagram for illustrating handling of data when button 2102 is operated (when "erase" is designated). In FIG. 23, a data area 430 is further set in memory 160. Data area 430 is a storage area for a network of which security level is "high" similarly to data area 420. In the example in FIG. 23, the network system includes a network of which security level is "high" other than network 1 and network 2. Data area 430 is an area for storing data received from another network. Data area 430 includes a personal BOX 431 which stores data for each user and a shared BOX 432 for storing data shared among users.

As shown in FIG. 23, CPU 150 copies data of each user in personal BOX 421 to a folder of each corresponding user in personal BOX 431 as being encrypted. When the security level of network 2 is changed from "high" to "normal", CPU 150 has data received so far from a terminal on network 2 stored in an area for storage of data received from another network of which security level is "high". Thereafter, CPU 150 erases data in personal BOX 421. CPU 150 erases data in shared BOX 422 without copying the data to another area.

Although embodiments of the present invention have been described and illustrated in detail, the disclosed embodiments are made for the purposes of illustration and example only and not limitation. The scope of the present invention should be interpreted by terms of the appended claims

What is claimed is:

1. An information processing apparatus comprising:
a first network interface configured to accept access from a terminal on a first network;
a second network interface configured to accept access from a terminal on a second network;
a hardware processor configured to process access from the terminal on the first network and the terminal on the second network; and
a memory,
the memory including a first area configured to store data received from the terminal on the second network,
the second network being higher in security level than the first network, and
the hardware processor being configured to
permit access to data stored in the first area from the terminal on the second network, and
restrict access to data stored in the first area from the terminal on the first network.

2. The information processing apparatus according to claim 1, wherein
the hardware processor is configured to encrypt the data received from the terminal on the second network and to have the data stored in the first area.

3. The information processing apparatus according to claim 1, wherein
the memory further includes a second area, and
the hardware processor is configured to
permit access to data stored in the second area from the terminal on the first network, and
when the terminal on the first network is permitted to view the data received from the terminal on the second network, have the data stored in the first area without encrypting the data and have the data stored in the second area as being encrypted.

4. The information processing apparatus according to claim 1, further comprising an image forming unit configured to execute a print job, wherein
the hardware processor is configured to
when the hardware processor receives data of the print job from the terminal on the second network, have the data of the print job stored in the memory as being encrypted, and
decrypt the data when the image forming unit executes the print job.

5. The information processing apparatus according to claim 1, wherein
the hardware processor is configured to
when the hardware processor receives data of a print job from the terminal on the second network, have the data of the print job stored in the memory as being encrypted,
when an image forming apparatus on the first network executes the print job, transmit data of the print job to the image forming apparatus as being encrypted, and
when an image forming apparatus on the second network executes the print job, transmit data of the print job to the image forming apparatus on the second network as being decrypted.

6. The information processing apparatus according to claim 1, wherein
the hardware processor is configured to
upload data to a cloud server as being encrypted,
determine whether a terminal which requests the uploaded data is a terminal on the second network in response to a request from the cloud server, and
when the terminal which requests the data is the terminal on the second network, decrypt the data and transmit the decrypted data to the cloud server or an access source, or transmit a key for decryption of the data to the access source.

7. The information processing apparatus according to claim 1, wherein
when a security level of the second network is changed to a lower security level, the hardware processor is configured to have data in the first area stored as being encrypted in an area in the memory corresponding to the changed security level.

8. The information processing apparatus according to claim 1, wherein
when a security level of the second network is changed to a lower security level, the hardware processor is configured to have data in the first area stored in an area in the memory corresponding to the security level before change.

9. An information processing apparatus comprising:
a first network interface configured to accept access from a terminal on a first network;
a second network interface configured to accept access from a terminal on a second network;
a hardware processor configured to process access from the terminal on the first network and the terminal on the second network; and
a memory,
the memory including a first area configured to store data received from the terminal on the second network,
the second network being higher in security level than the first network, and
the hardware processor being configured to
transmit data stored in the first area to the terminal on the first network as being encrypted, and
transmit data stored in the first area to the terminal on the second network as being decrypted.

10. The information processing apparatus according to claim 9, wherein
the memory further includes a second area, and
the hardware processor is configured to
permit access to data stored in the second area from the terminal on the first network, and
when the terminal on the first network is permitted to view the data received from the terminal on the second network, have the data stored in the first area without encrypting the data and have the data stored in the second area as being encrypted.

11. The information processing apparatus according to claim 9, further comprising an image forming unit configured to execute a print job, wherein
the hardware processor is configured to
when the hardware processor receives data of the print job from the terminal on the second network, have the data of the print job stored in the memory as being encrypted, and
decrypt the data when the image forming unit executes the print job.

12. The information processing apparatus according to claim 9, wherein
the hardware processor is configured to when the hardware processor receives data of a print job from the terminal on the second network, have the data of the print job stored in the memory as being encrypted, when an image forming apparatus on the first network executes the print job, transmit data of the print job to the image forming apparatus as being encrypted, and when an image forming apparatus on the second network executes the print job, transmit data of the print job to the image forming apparatus on the second network as being decrypted.

13. The information processing apparatus according to claim 9, wherein
the hardware processor is configured to
upload data to a cloud server as being encrypted,
determine whether a terminal which requests the uploaded data is a terminal on the second network in response to a request from the cloud server, and
when the terminal which requests the data is the terminal on the second network, decrypt the data and transmit the decrypted data to the cloud server or an access source, or transmit a key for decryption of the data to the access source.

14. The information processing apparatus according to claim 9, wherein
when a security level of the second network is changed to a lower security level, the hardware processor is configured to have data in the first area stored as being encrypted in an area in the memory corresponding to the changed security level.

15. The information processing apparatus according to claim 9, wherein
when a security level of the second network is changed to a lower security level, the hardware processor is configured to have data in the first area stored in an area in the memory corresponding to the security level before change.

16. A non-transitory computer readable recording medium having a program stored thereon, the program being executed by a computer of an information processing apparatus including a first network interface configured to accept access from a terminal on a first network, a second network interface configured to accept access from a terminal on a second network, and a memory, the memory including a first area in which data received from the terminal on the second network is stored together with information representing reception of the data from the terminal on the second network, the second network being higher in security level than the first network, the program, by being executed, causing the computer to perform:
accepting an access to the information processing apparatus for one of the terminal on the first network or the terminal on the second network;
determining whether the accepted access is for the terminal on the first network; and
restricting access to data stored in the first area if the accepted access is for the terminal on the first network.

17. A non-transitory computer readable recording medium having a program stored thereon, the program being executed by a computer of an information processing apparatus including a first network interface configured to accept access from a terminal on a first network, a second network interface configured to accept access from a terminal on a second network, and a memory, the memory including a first area configured to store data received from the terminal on the second network, the second network being higher in security level than the first network, the program, by being executed, causing the computer to perform:
transmitting data stored in the first area to the terminal on the first network as being encrypted, and
transmitting data stored in the first area to the terminal on the second network as being decrypted.

* * * * *